Oct. 10, 1967     W. W. BIRD     3,346,441
AIR-INFLATED STRUCTURES
Filed April 8, 1963     2 Sheets-Sheet 2
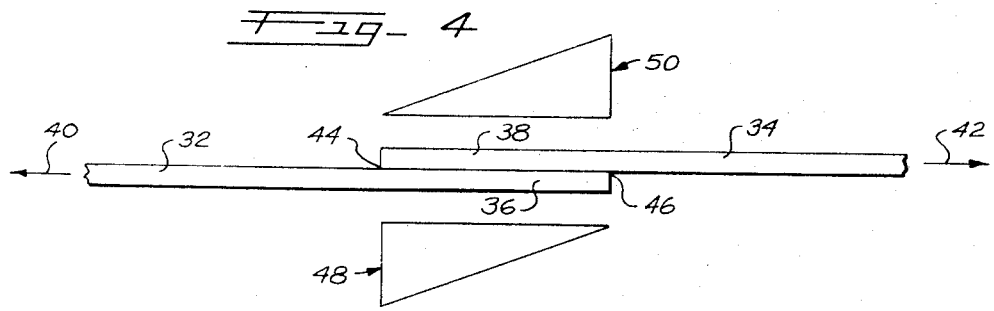
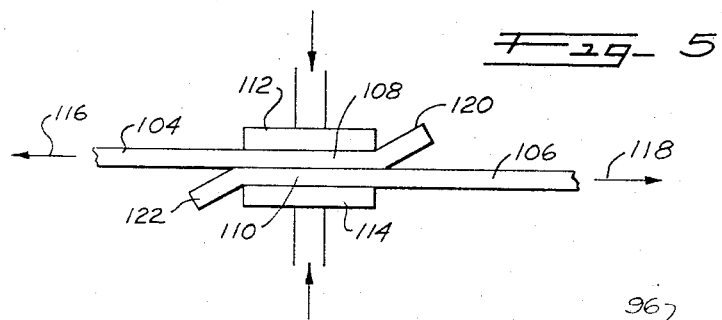
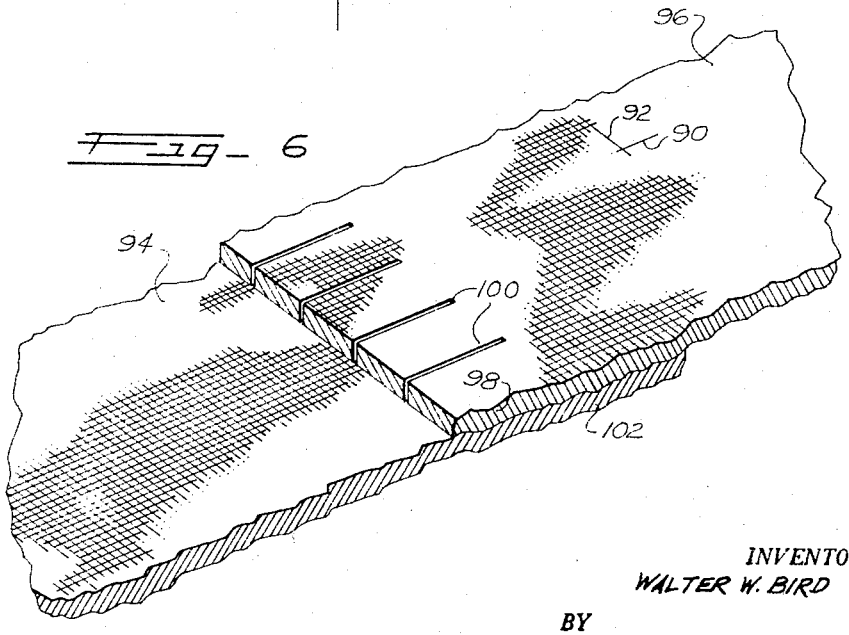
INVENTOR.
WALTER W. BIRD
BY
Bean, Brooks, Buckley & Bean
ATTORNEYS United States Patent Office 3,346,441
Patented Oct. 10, 1967

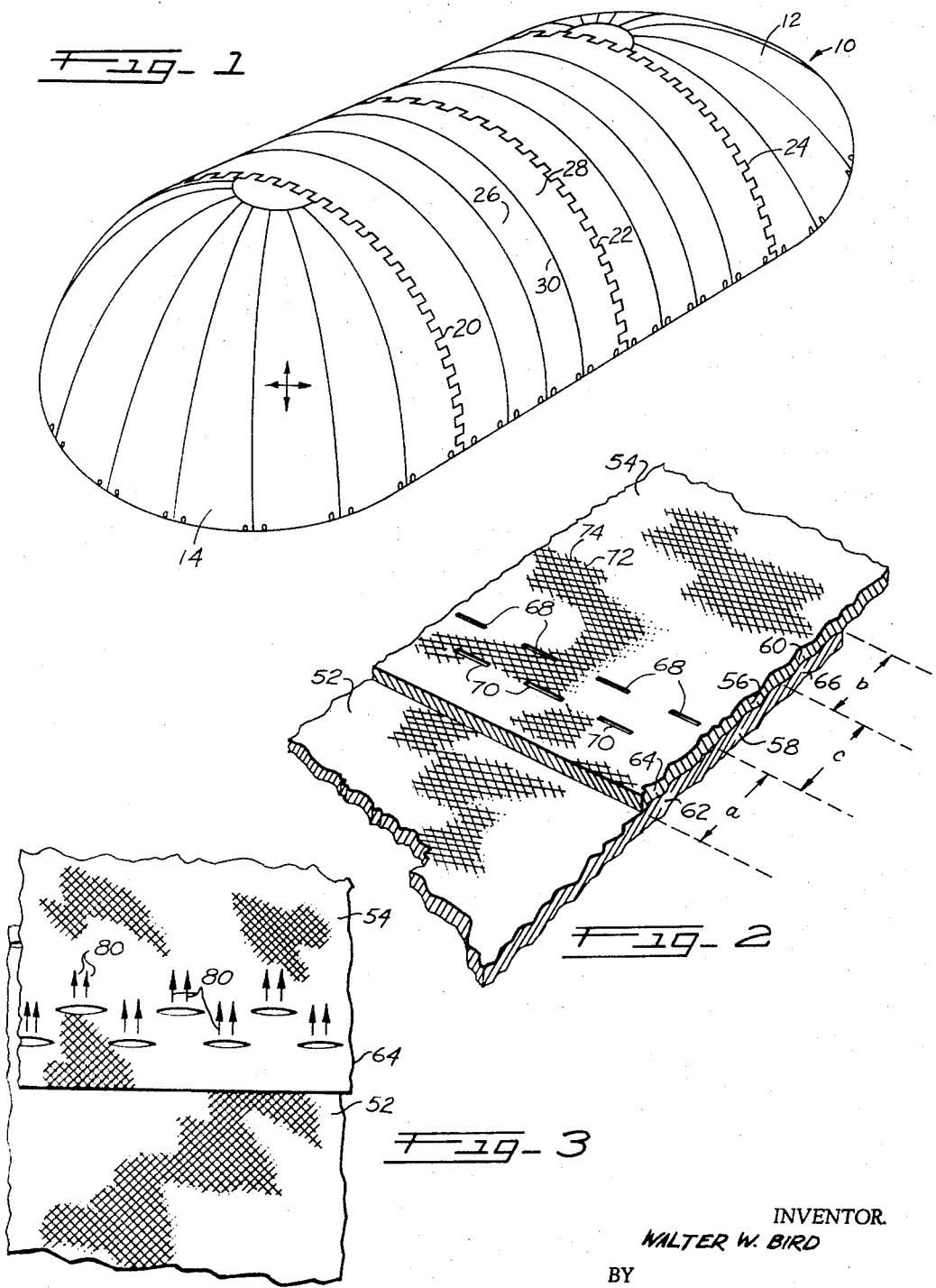

3,346,441
AIR-INFLATED STRUCTURES
Walter W. Bird, Williamsville, N.Y., assignor to Birdair Structures Inc., Buffalo, N.Y.
Filed Apr. 8, 1963, Ser. No. 271,225
5 Claims. (Cl. 161—36)

This invention relates to air-inflated building structures and pertains, more particularly, to improved means for joining adjacent panels forming an envelope structure of an air-inflated building.

In air-inflated building constructions such as are contemplated in connection with the present invention, the structural building envelope is constructed of flexible material and is formed from a plurality of panels joined in edge-to-edge relationship. The particular material employed is usually of the woven type and is treated with material such as latex or the like to fill the pores or interstices of the woven material and render the same substantially impervious to the leakage of air. In joining the panels as aforesaid in edge-to-edge relationship, it has been found that adhesives or, bonding methods in general, are by far the most economical since more conventional methods of attaching fabrics or flexible materials, such as by sewing, cannot provide the high strength and serviceability required and inherently destroy the air retention characteristics of the envelope and would therefore require subsequent treatment to restore the airtight nature of the envelope.

In my copending application Ser. No. 739,022, filed June 2, 1958, now U.S. Patent 3,116,746, there is disclosed means for joining sections of an air-inflated building envelope whereby such sections may be readily and easily detached or secured together. Such means are necessary under circumstances wherein the building is required to be moved from place to place periodically or where extremely large structures are involved. In the latter case, it is necessary and desirable to divide the envelope into a series of smaller sections so as to be readily transportable and easily managed and manipulated. Each of the sections, however, are further divided into a series of smaller panels which are necessary for obvious reasons since building constructions contemplated herein may be several hundreds of feet in length. It is in the joining together of these smaller adjacent panels that the present invention is directed. In joining such panels together, it is of importance to do so in such fashion as to obviate the existence of areas or regions of excessive stress concentration, it being appreciated that the joints between adjacent panels must transfer tension loads from one panel to another and which tension loads may be considerable. That is to say, the internal air pressure which holds the envelope in inflated condition itself tensions the envelope to a substantial degree. Additionally, external forces such as wind loads and the like may apply short-lived tension loads much greater than the inflation tension load. Consequently, the existence of any areas of stress concentration represents a potential source of failure.

As hereinbefore stated, the conventional means for joining adjacent panels together is by bonding or adhesive means and, in general, this is an entirely adequate method of joining the edges of the panels. However, it is always of interest to render the construction more efficient and on large, highly loaded structures it becomes increasingly difficult to provide a satisfactory joint. To this end, the present invention is directed to means whereby the tension loads transferred from one panel to another through the joined edges thereof are transferred in such fashion as to mitigate shear stresses in those areas and regions wherein the same are inherently greatest. According to the present invention, the overlapped edges of adjacent panels are adhesively secured, bonded or the like substantially throughout the area in which they are overlapped. Each such area of overlapping may be considered to be divided into three zones, a central zone, an inner zone and an outer zone with the overlapped edges being so positioned relative to each other that the central zones of each are disposed in opposed relationship to thereby position the inner zone of one panel edge in opposition to the outer zone of the other panel edge and vice versa. The outer zone of each panel edge area is constructed to be of less resistance to elongation in a direction normal to the joined edges than is the remainder or main body portion of the panel. In this fashion, as will hereinafter more clearly appear, stress concentrations are minimized in the most critical area or region of the joint between the two panels so that not only is the structure thereby rendered more efficient, and less likely to premature failure, but also the assembly can resist higher tension loads induced either by the inflation or external forces.

It is therefore of primary concern in connection with the present invention to provide an improved joint means between adjacent panels of an air-inflated structure in which the joint is characterized by inherently lower shear stress concentrations at the edge portions of the overlapped panels.

Other objects and advantages of the invention will appear from the description hereinbelow and the accompanying drawing wherein:

FIG. 1 is a perspective view showing an air-inflated and supported building structure of the type to which the present invention appertains;

FIG. 2 is a perspective view showing portions of adjacent overlapped panels and illustrating one form of joint which may be effected therebetween;

FIG. 3 is a plan view of the assembly shown in FIG. 2;

FIG. 4 is a diagrammatic view illustrating the transfer of tension loads across a joint;

FIG. 5 is a diagrammtic view illustrating the manner of constructing a modified form of joint according to the present invention; and FIG. 6 is a view similar to FIG. 2 but illustrating another modification of joint construction.

Referring at this time more particularly to FIG. 1, the construction shown therein and indicated generally by the reference character 10 is an air-supported, air-inflated building structure in which the envelope defining the building is, in the particular instance shown, divided into four sections, the two end sections 12 and 14 and the intermediate sections 16 and 18. These several sections may be detachably joined together as indicated by the joints 20, 22 and 24, such joints being in accordance, for example, with my aforementioned copending application Ser. No. 739,022, now U.S. Patent 3,116,746. Each section, or for that matter the entire envelope, may be formed from a plurality of adjacent panels such as those indicated by reference characters 26 and 28 for example in the intermediate section 16 and between these adjacent panels, there is formed a joint such as that indicated by the reference character 30 in FIG. 1. As has been set forth hereinabove, the envelope is preferably constructed of a woven material impregnated with suitable means which may be latex, plastic or the like which fills the interstices of the woven material and renders the same substantially impervious to the passage of air therethrough. This is necessary in order to retain the volume of air which fills and tensions the envelope so as to render it self-supporting. As has also been set forth hereinabove, it is desirable that a high strength joint be used in order to assume full utiliziation of material strength, and, for this reason, an overlapped joint such as is indicated in FIG. 4 is preferably used. In FIG. 4, adjacent panels 32 and 34 are diagrammatically illustrated, the same being provided with edge portions 36 and 38 respectively which are disposed in overlapped relationship to each other and which are either adhesively secured together or otherwise bonded or connected in face-to-face contact substantially throughout the areas thereof which are in the overlapped relationship. In transferring tension from one panel to the next, through the overlapped joint, the tension force being diagrammatically indicated by the arrows 40 and 42. It will be seen that for the panel 32, maximum tension is encountered up to the point 44 at which the outer edge of the panel 34 is joined thereto and that this tension gradually diminishes to zero at the opposite counterpart edge portion 46, all as is indicated by the diagram 48 below the correspodning portion of the panel 32. By the same token and at the same time, tension is being built up in the portion 38 of the panel 34 starting from the zero point at the edge 44 to a maximum opposite the edge 46; as is indicated by the diagram 50 in FIG. 4. The rate of transfer of load will of course vary with the elastic properties of the material, the lower the elasticity the more uniform the transfer.

Ordinarily, the panels 32 and 34 will be very similar in nature so that each has a finite and definite resistance to elongation which will be the same in each case. Consequently, it will be manifest that along the edge 44, the panel portion 38, since it is at a region of very little tension load therein as indicated by the diagram 50, will not be subjected to very great elongation whereas the underlying portion of the panel 32 will be subjected to the greatest elongation that exists within the portion 36 thereof. Thus, a condition is present adjacent each of the edge points 44 and 46 wherein a maximum of shear stress occurs by virtue of the fact that the material underlying such edge portions 44 and 46 is stretched a maximum amount whereas the overlying edge portions are stretched a minimum due to the tension load characteristics as indicated by the two diagrams 48 and 50. Thus, any tendency of the two poritons 36 and 38 to peel away from each other will occur predominantly at the edges 44 and 46. Consequently, the structural design must be such that the maximum permissible shear stress to which the bonding or adhesive material may be subjected is not exceeded under actual conditions of usage.

According to the present invention, to reduce the shear stresses occurring as set forth hereinabove, edge portions of the two adjacent panels are constructed in such fashion that they have less resistance to elongation transversely of the joint than do the main body portions thereof and, more importantly, than is exhibited in the immediately underlying portions of the other panel. One manner in which this may be accomplished is shown in FIG. 2. In this particular case, the adjacent panels 52 and 54 are provided with overlapped edge portions as shown. Furthermore, each of these edge portions is divided into a central zone or region as indicated by reference characters 56 and 58 and by inner and outer zones respectively as indicated by the reference characters 60, 62 and 64, 66. The two outer zones 64 and 66 are constructed so as to exhibit less resistance to elongation transversely of the joint formed than are the remaining areas of the two panels 52 and 54. In the specific instance shown, this is accomplished by providing the line of slits 68 and the line of slits 70. Preferably, as shown, these lines of slits are staggered relative to each other with no or substantially no overlap between the slits of the two lines. This particular method of rendering the outer zones 64 and 66 of less resistance to elongation is particularly well adapted and suited for 2-ply material where one ply is laid up on the bias as is indicated by the warp and fill threads 72 and 74 respectively in FIG. 2. Preferably, the warp and fill threads are at substantially the same angle, 45°, to the edges of the panels 52 and 54. In this fashion, the load will be transferred from the panel 52 to the panel 54 as is shown in FIG. 3, wherein it will be noted that the loading at the edge of the material is picked up and transferred by the bias ply which is inherently more elastic than the straight ply and carried up between the slits into the central zone of the joint. The slits 68 and 70 open up slightly, like eyelets, due to the relaxation of the outer zone 64 permitted by their existence. Thus, the existence of high shear stresses adjacent the edges 44 and 46 in FIG. 4 will be avoided.

This effect is achieved for the reasons stated in conjunction with the description of FIG. 4. That is to say, in the FIG. 2 embodiment, it will be appreciated that the region or zone 64 of the panel 54 has substantially less resistance to elongation due to the existence of the slits 68 and 70 than does the underlying inner zone 62 of the panel 52. Since it is the inner zone 62 of the panel 52 which is subjected to the greatest tension in transferring the load across the joint, as is illustrated in FIG. 4, and since the zone or region 64 of the panel 54 exhibits a lessened resistance to elongation by virtue of the existence of the slits 68 and 70, it will be appreciated that the zone 64 of the panel 54 will elongate by a greater amount than would otherwise occur, thus lessening the shear stress introduced in this zone or region. Therefore, whatever means is employed to secure the edge portions of the two panels 52 and 54 in overlapped relationship will not have as great a tendency to peel as would otherwise occur. In FIG. 2, the joint itself will be seen to have been divided into the three regions or zones as indicated by the reference characters *a*, *b* and *c*, the region *a* being the region or zone in which the two regions 62 and 64 of the respective panels 52 and 54 are in opposed relationship, the region *b* being that area within which the two regions 60 and 66 of the panels 54 and 52 respectively are opposed and the region *c* being that area wherein which the central zones or regions 56 and 58 of the two panels are in opposition. It is appreciated, of course, that it is the two zones 64 and 66 which contain the slits 68 and 70, the zones 60 and 62 being similar as are the zones 56 and 58.

FIG. 3 illustrates the panels as they are under tension transversely across the joint, it will be appreciated that the panels will also be under tension normally longitudinally or parallel of the joint and, in FIG. 3, the arrows 80 serve to indicate the manner in which the tension load transfer is transferred between the slits 68 and 70.

As has been set forth, the specific construction according to FIG. 2 is most advantageously used in association with panels wherein a 2-ply, 45° bias laminated material is used. To illustrate the modification of the invention which is particularly well suited for applications where heavy single ply material is used wherein the warp threads are disposed at right angles to the edges of the panels, reference should be made to FIG. 6. In this figure, the warp threads are indicated by the reference character 92 and the fill threads by the reference character 90. The relationship between the central, inner and outer zones of the two panels 94 and 96 is the same as was described in relationship to FIG. 2, it being noted that the outer zone 98 of the panel 96 is provided with a series of slits 100 which are parallel to the direction of the fill threads 90. Thus, the slits 100 sever the warp threads 92 at spaced points therealong and do so up to the ends of the several slits 100. Because of this relationship, when the panels 94 and 96 are tensioned so as to require transfer of the load through the joint the fill threads 90 in the outer zones 98 and 102 of the two panels are permitted to straighten out more easily than they otherwise would. This is due to the fact that the warp threads 92 normally form undulations or kinks in the fill threads and when the warp threads are severed, the fill threads are permitted to straighten out much more easily, under load, than would otherwise be the case. In the remainder of the body of the fabric panels 94 and 96, it will be appreciated that both the fill and the warp threads are under tension so that the tension in the warp threads will tend to maintain the undulations or kinks within the fill threads unless they have been severed as is indicated by the slits 100. Thus, in FIG.

6, as is the case in FIG. 2, the outer zones 98 and 102 of the two panels are constrained to be of less resistance to elongation and normal to the edges of the panels than is the material of the panels within the remaining portions thereof. In this fashion, high concentrations of shear stress at the edges of the panels is reduced, substantially as is set forth with regard to FIGS. 2 and 4 hereinabove.

To illustrate a still further embodiment of the invention, reference is now had to FIG. 5. In this figure, the two panels are designated by reference characters 104 and 106 and these two panels are shown to have been adhesively bonded or secured together in their central regions 108 and 110 respectively, the anvil members 112 and 114 serving to sandwich these portions together as is shown. Subsequent to the securement of these two portions 108 and 110 together, the two panels 104 and 106 are subjected to tension as indicated by the arrows 116 and 118 which will leave the outer zones or regions 120 and 122 of the two panels, respectively, in relaxed condition. While the panels are tensioned as aforesaid, the outer end portions 120 and 122 are bonded or adhesively secured to the respective main body portions of the other panel in each case so that when the tension is relaxed on the panels 104 and 106, the outer end portions 120 and 122 will be subjected to some degree of compression or wrinkling so that subsequently, when used, and the panels are once again tensioned due to the inflation pressure or external loads such as wind loads, the relaxed outer regions 120 and 122 will exhibit little resistance to elongation as compared with the remaining portions of the two panels.

It is to be understood that certain changes and modifications as illustrated and described may be made without departing from the spirit of the invention or the scope of the following claims.

I claim:

1. In an air-inflated building construction,
a pair of adjacent panels of flexible woven material having side edge portions thereof in overlapped face-to-face relation and bonded together substantially throughout the area of such edge portions,
each such edge portion having a central region and inner and outer zones on either side thereof with the central regions of the two edge portions being in opposed relation so that the inner zone of one edge portion is opposed to the outer zone of the other edge portion and vice versa,
the main body portions of said panels, exclusive of the stated side edge portion, having a given resistance to elongation,
said side edge portions having their outer zones constructed to exhibit less resistance to elongation than said main body portions, and each of said outer zones being provided with a line of spaced slits extending generally parallel to an associated panel edge.

2. In an air-inflated building construction,
a pair of adjacent panels of flexible woven material having side edge portions thereof in overlapped face-to-face relation and bonded together substantially throughout the area of such edge portions,
each such edge portion having a central region and inner and outer zones on either side thereof with the central regions of the two edge portions being in opposed relation so that the inner zone of one edge portion is opposed to the outer zone of the other edge portion and vice versa,
the main body portions of said panels, exclusive of the stated side edge portions, having a given resistance to elongation,
said side edge portions having their outer zones constructed to exhibit less resistance to elongation than said main body portions, and each of said outer zones being provided with a line of spaced slits extending generally parallel to an associated panel edge,
there being a further line of spaced slits in each outer zone parallel to the first mentioned line of slits and staggered relative thereto.

3. In an air-inflated building construction,
a pair of adjacent panels of flexible woven material having side edge portions thereof in overlapped face-to-face relation and bonded together substantially throughout the area of such edge portions,
each such edge portion having a central region and inner and outer zones on either side thereof with the central regions of the two edge portions being in opposed relation so that the inner zone of one edge portion is opposed to the outer zone of the other edge portion and vice versa,
the main body portions of said panels, exclusive of the stated side edge portions, having a given resistance to elongation,
said side edge portions having their outer zones constructed to exhibit less resistance to elongation than said main body portions, and each of said outer zones being provided with a line of spaced slits extending generally parallel to an associated panel edge,
said panels being of woven material with the warp and fill threads thereof intersecting the edge of each panel at the an angle of about 45°.

4. In an air-inflated building construction,
a pair of adjacent panels of flexible woven material having side edge portions thereof in overlapped face-to-face relation and bonded together substantially throughout the area of such edge portions,
each such edge portion having a central region and inner and outer zones on either side thereof with the central regions of the two edge portions being in opposed relation so that the inner zone of one edge portion is opposed to the outer zone of the other edge portion and vice versa,
the main body portions of said panels, exclusive of the stated side edge portions, having a given resistance to elongation,
said side edge portions having their outer zones constructed to exhibit less resistance to elongation than said main body portions, and each of said outer zones being provided with a line of spaced slits extending generally parallel to an associated panel edge,
there being a further line of spaced slits in each outer zone parallel to the first mentioned line of slits and staggered relative thereto,
said panels being of woven material with the warp and fill threads thereof intersecting the edge of each panel at an angle of about 45°.

5. In an air-inflated building construction,
a pair of adjacent panels of flexible woven material having side edge portions thereof in overlapped face-to-face relation and bonded together substantially throughout the area of such edge portions,
each such edge portion having a central region and inner and outer zones on either side thereof with the central regions of the two edge portions being in opposed relation so that the inner zone of one edge portion is opposed to the outer zone of the other edge portion and vice versa,
the main body portions of said panels, exclusive of the stated side edge portions, having a given resistance to elongation,
said side edge portions having their outer zones constructed to exhibit less resistance to elongation than said man body portions, each of said outer zones being provided with a line of spaced slits extending generally parallel to an associated panel edge,
there being a further line of spaced slits in each outer zone parallel to the first mentioned line of slits and staggered relative thereto,
each of said panels being of two-play construction, one ply having the warp and fill threads thereof intersecting the edge of the panel at an angle of 45° and the other ply having threads intersecting the edge of the panel substantially at right angles.

References Cited

UNITED STATES PATENTS

| | | | | |
|---|---|---|---|---|
| 2,679,468 | 5/1954 | Pitman | | 161—36 |
| 2,800,423 | 7/1957 | De Swart. | | |
| 2,939,467 | 6/1960 | Meyer et al. | | 135—1 |
| 3,107,195 | 10/1963 | Stegler et al. | | 161—36 |

ALEXANDER WYMAN, *Primary Examiner.*

H. R. MOSELEY, *Examiner.*

R. A. FLORES, L. J. SANTISI, *Assistant Examiners.*